United States Patent [19]

Ishii et al.

[11] Patent Number: 4,717,745
[45] Date of Patent: * Jan. 5, 1988

[54] STABILIZED POLYACETAL RESIN COMPOSITIONS

[75] Inventors: Tamaki Ishii, Suita; Shinichi Yachigo, Toyonaka; Manji Sasaki, Ibaraki; Haruki Okamura, Osaka; Masahisa Shionoya, Izumi, all of Japan

[73] Assignee: Sumitomo Chemical Company, Ltd., Osaka, Japan

[*] Notice: The portion of the term of this patent subsequent to Mar. 18, 2003 has been disclaimed.

[21] Appl. No.: 848,116

[22] Filed: Apr. 4, 1986

[30] Foreign Application Priority Data

Apr. 11, 1985 [JP] Japan .................... 60-77260

[51] Int. Cl.$^4$ ............................ C08K 5/34; C08K 5/49
[52] U.S. Cl. ...................................... 524/91; 524/108; 524/103; 524/102; 524/100; 524/120
[58] Field of Search ................ 524/100, 102, 108, 103, 524/91

[56] References Cited

U.S. PATENT DOCUMENTS 4,576,734 3/1986 Ishii et al. ................ 524/108

FOREIGN PATENT DOCUMENTS 155847 9/1985 European Pat. Off. ............ 524/108
25826 2/1984 Japan.

OTHER PUBLICATIONS

Chemical Abstracts, 101, vol. 2, No. 8213w.

Primary Examiner—Morton Foelak
Assistant Examiner—Kriellion S. Morgan
Attorney, Agent, or Firm—Wenderoth, Lind & Ponack

[57] ABSTRACT

Polyacetal resin compositions are stabilized to heat, oxygen and light by incorporation a phenolic type compound represented by the formula

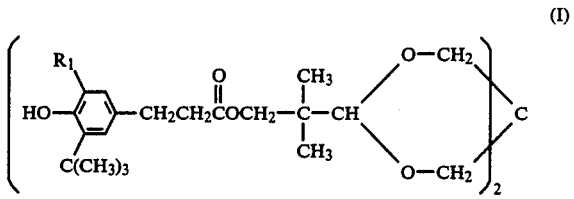

4 Claims, No Drawings

STABILIZED POLYACETAL RESIN COMPOSITIONS

The present invention relates to polyacetal resin compositions improved in stability to heat, oxygen and light characterized by containing a phenolic type compound represented by the general formula (I),

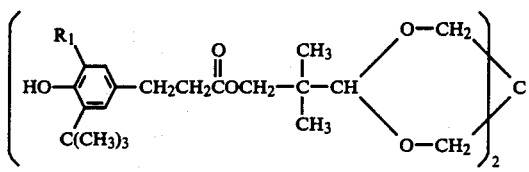

wherein $R_1$ represents a $C_1$-$C_3$ alkyl group.

Polyacetal resins are a thermoplastic resin of which the main chain is polyoxmethylene, and they have excellent mechanical and physical properties and chemical resistance as well as good moldability and fabricability. The resins are therefore processed by various methods such as blow molding, extrusion molding, injection molding, etc., and find wide applications in the fields of electric electronic parts, piping, building materials, fibers, etc., their application range being increasingly extending in recent years.

It is however well known that polyacetal resins themselves deteriorate by the action of heat, oxygen and light to remarkably reduce in the physical properties.

Also, it is well known that the deterioration proceeds from the terminal to the inner part of the polymer chain with the evolution of a very irritative formaldehyde gas which causes problems of safety sanitation.

Hitherto, for the purpose of preventing such deterioration of polyacetal resins, various improvements, for example treatment of the resin terminals by acetylation, alkylation, urethanation, etc., introduction of ethylene groups into the polyoxymethylene main chain by the use of ethylene oxide as a comonomer, and the like, have been tried, but quite satisfactory results have not yet been obtained.

Also, there are proposals of adding antioxidants, light stabilizers, etc. to polyacetal resins, but this method is not always quite satisfactory in terms of stability to heat, oxygen and light.

In view of such present situation, the present inventors extensively studied to attain a further improvement in the stability of polyacetal resins to heat, oxygen and light, and as a result, found that polyacetal resin compositions containing the particular phenolic type compound (I) exhibit a remarkable improvement in not only stability to heat and oxygen, but also in that to light, and also that said stability of the compositions improves to a further degree by using particular amounts of a hindered piperidine compound together. The present inventors thus completed the present invention.

The phenolic type compound of the general formula (I) used in the present invention can be produced by esterification of 3-(3-alkyl-5-tert-butyl-4-hydroxyphenyl)propionic acid or its acid halide or acid anhydride with 3,9-bis(2-hydroxy-1,1-dimethylethyl)-2,4,8,10-tetraoxaspiro[5.5]undecane, or common ester interchange of a lower alkyl ester of said acid with said undecane.

In the phenolic type compound represented by the general formula (I), $R_1$ represents a methyl, ethyl or propyl group, but a methyl group is preferred in terms of heat resistance, oxidation resistance and weather resistance.

The effect is developed by adding said compound in an amount of not less than 0.01% by weight, preferably not less than 0.1% by weight based on polyacetal resins. Amounts exceeding 10% by weight are disadvantageous economically, because the effect enough to correspond to such increase in amount is difficult to obtain.

Polyacetal resins used in the present invention are a resin of which the main chain is polyoxymethylene, and their examples include for example acetal homopolymers obtained by the polymerization of formaldehyde, acetal copolymers obtained by the copolymerization of trioxane, a cyclic trimer of formaldehyde, with small amounts of cyclic ethers (e.g. ethylene oxide, dioxolan), and the like.

The polyacetal resin compositions of the present invention are characterized by containing the phenolic type compound (I), but not only their stability to light, but also that to heat and oxygen improve to a further degree by using together a hindered piperidine compound of 0.1 to 5 times by weight, preferably 0.5 to 2 times by weight based on the phenolic type compound.

Such hindered piperidine compound includes for example bis(2,2,6,6-tetramethyl-4-piperidyl)sebacate, bis(1,2,2,6,6-pentamethyl-4-piperidyl)sebacate, polycondensation products of dimethyl succinate with 1-(2-hydroxyethyl)-4-hydroxy-2,2,6,6-tetramethylpiperidine, poly[[6-[(1,1,3,3-tetramethylbutyl)amino]-s-triazine-2,4-diyl][(2,2,6,6-tetramethyl-4-piperidyl)imino]-hexamethylene [(2,2,6,6-tetramethyl-4-piperidyl)imino]], 1-[2-[(3-(3,5-di-tert-butyl-4-hydroxyphenyl)-propionyloxy]ethyl]-4-[3-(3,5-di-tert-butyl-4-hydroxyphenyl)propionyloxy]-2,2,6,6-tetramethylpiperidine, bis(1,2,2,6,6-pentamethyl-4-piperidyl) 2-(3,5-di-tert-butyl-4-hydroxybenzyl)-2-n-butylmalonate, tetrakis(2,2,6,6-tetramethyl-4-piperidyl) 1,2,3,4-butanetetracarboxylate, poly[6-morpholino-s-triazin-2,4-diyl-[(2,2,6,6-tetramethyl-4-piperidyl)imino]hexamethylene[(2,2,6,6-tetramethyl-4-piperidyl)imino]] and the like.

The foregoing compounds may be added to polyacetals resins at any step of the production thereof, but preferably, they are added after formation of the final polymers.

The polyacetal resin composition of the present invention may contain other additives such as antioxidants, heat stabilizers, ultraviolet absorbers, pigments, surface active agents, antistatic agents, fillers, etc. Particularly, the color of said composition can be improved by using antioxidants together, for example phosphite type compounds such as distearyl pentaerythritol diphosphite, tris(2,4-di-tert-butylphenyl)phosphite, tris(2-tert-butyl-4-methylphenyl)phosphite, bis(2,4-di-tert-butylphenyl)pentaerythritol diphosphite, tetrakis(2,4-di-tert-butylphenyl)-4,4'-biphenylene diphosphite, etc.

The present invention will be illustrated in detail with reference to the following examples, but it is not limited to these examples.

PREPARATION EXAMPLE 1

(Preparation of Compound I-1)

To a mixture of 30.2 g (0.121 mole) of methyl 3-(3-tert-butyl-4-hydroxy-5-methylphenyl)propionate and 15.3 g (0.0503 mole) of 3,9-bis(2-hydroxy-1,1-dimethylethyl)-2,4,8,10-tetraoxaspiro[5.5]-undecane was added 0.82 g (0.015 mole) of sodium methoxide, and the mixture was heated. Reaction was carried out at 140° C. for 3 hours and then at 140° to 160° C. for 7 hours under reduced pressure of 50 mmHg.

After completion of reaction, the reaction product was dissolved in toluene and washed with aqueous dilute hydrochloric acid and then with water. Toluene was then removed by evaporation under reduced pressure to obtain 42.9 g of a crude product of 77% in purity. This product was purified by column chromatography on silica gel to obtain 24 g of 99%-purity 3,9-bis[2-[3-(3-tert-butyl-4-hydroxy-5-methylphenyl)propionyloxy]-1,1-dimethylphenyl]-2,4,8,10-tetraoxaspiro[5.5]undecane as a colorless glassy product (Compound I-1). m.p. 45°-55° C.

Elementary analysis (for $C_{43}H_{64}O_{10}$):

|  | C (%) | H (%) |
|---|---|---|
| Found | 69.61 | 8.98 |
| Calculated | 69.70 | 8.71 |

Mass analysis (FD-mass). Molecular ion peak: 740. Proton NMR (CDCl$_3$/TMS): δ(ppm) 0.92(s, 12H), 1.40(s, 18H), 2.21(s, 6H), 2.7(m, 8H), 3.4(m, 8H), 3.93(s, 4H), 4.17(s, 2H), 5.67(broad s, 2H), 6.85(broad s, 2H), 6.96(broad s, 2H).

PREPARATION EXAMPLE 2

(Preparation of Compound I-2)

Using a mixture of 33.6 g (0.121 mole) of methyl 3-(3-tert-butyl-4-hydroxy-5-isopropylphenyl)propionate, 15.3 g (0.0503 mole) of 3,9-bis(2-hydroxy-1,1-dimethylethyl)-2,4,8,10-tetraoxaspiro[5.5]-undecane and 0.82 g (0.015 mole) of sodium methoxide, reaction, after-treatment and purification were carried out in the same manner as in Preparation Example 1 to obtain 29 g of 98%-purity 3,9-bis[2-[3-(3-tert-butyl-4-hydroxy-5-isopropylphenyl)propionyloxy]-1,1-dimethylethyl]-2,4,8,10-tetraoxaspiro[5.5]undecane as a colorless glassy product (Compound I-2). m.p. 47°-57° C.

Elementary analysis (for $C_{47}H_{72}O_{10}$):

|  | C (%) | H (%) |
|---|---|---|
| Found | 70.93 | 9.41 |
| Calculated | 70.82 | 9.10 |

Mass analysis (FD-mass). Molecular ion peak: 796. Proton NMR (CDCl$_3$/TMS): δ(ppm) 0.91(s, 12H), 1.26(d, 12H), 1.40(s, 18H), 2.7(m, 10H), 3.4(m, 8H), 3.92(s, 4H), 4.19(s, 2H), 4.73(broad s, 2H), 6.91(broad s, 2H), 6.93(broad s, 2H).

PREPARATION EXAMPLE 3

(Preparation of Compound AO-1)

Using a mixture of 35.3 g (0.121 mole) of methyl 3-(3,5-di-tert-butyl-4-hydroxyphenyl)propionate, 15.3 g (0.0503 mole) of 3,9-bis(2-hydroxy-1,1-dimethylethyl)-2,4,8,10-tetraoxaspiro[5.5]undecane and 0.82 g (0.015 mole) of sodium methoxide, reaction, after-treatment and purification were carried out in the same manner as in Preparation Example 1 to obtain 21 g of 99%-purity 3,9-bis[2-[3-(3,5-di-tert-butyl-4-hydroxyphenyl)propionyloxy]-1,1-dimethylethyl]-2,4,8,10-tetraoxaspiro[5.-5]undecane as a white crystal (Compound AO-1). m.p., 98°-100° C.

Elementary analysis (for $C_{49}H_{76}O_{10}$):

|  | C (%) | H (%) |
|---|---|---|
| Found | 71.76 | 9.63 |
| Calculated | 71.33 | 9.28 |

Mass analysis (FD-mass). Molecular ion peak: 824. Proton NMR (CDCl$_3$/TMS): δ(ppm) 0.91(s, 12H), 1.42(s, 36H), 2.7(m, 8H), 3.4(m, 8H), 3.93(s, 4H), 4.21(s, 2H), 5.05(broad s, 2H), 6.97(broad s, 4H).

EXAMPLE 1

To Duracon M90-02 (commercially available polyacetal resin; produced by Polyplastics Co.) was added dichloroethane of three times by weight based on the resin, and the antioxidant contained in the resin was extracted by stirring at 70° C. for 24 hours.

After repeating twice this procedure, the unstabilized polyacetal resin was obtained by drying under reduced pressure. The resin thus obtained was dry-blended with the stabilizers in Table 2, pelletized by means of a small extruder and formed into test pieces of 40×60×2 mm (thick) on a 1-ounce injection molding machine.

The test piece was placed in a Geer oven kept at 160° C., and its weight reduction was measured at regular intervals to obtain a time required for the weight to reduce by 5% of that before thermal ageing. This time was taken as a thermal embrittlement induction period and used as a measure for the evaluation of heat and oxidation stability.

Also, the test piece similarly prepared was exposed to light in a fade meter (light source, ultraviolet carbon arc; and temperature of black panel, 63±3° C.), and a time required for surface cracks to appear was measured and used as a measure for the evaluation of weather resistance.

The result is shown in Table 2.

The symbols of the test compounds in Table 2 express the compounds described below:

TABLE 1

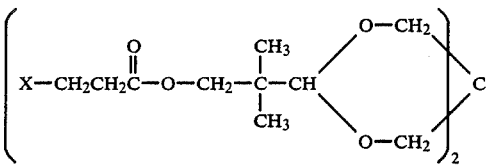

Compound No.    X

I-1 

I-2 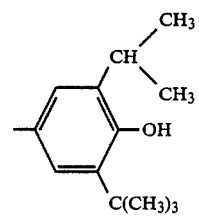

TABLE 1-continued $$\left( X-CH_2CH_2\overset{O}{\overset{\|}{C}}-O-CH_2-\underset{CH_3}{\overset{CH_3}{\overset{|}{C}}}-CH\overset{O-CH_2}{\underset{O-CH_2}{\diagup}}C \right)_2$$

| Compound No. | X |
|---|---|
| AO-1 | (2,6-di-tert-butyl-4-yl phenol structure with C(CH₃)₃, OH, C(CH₃)₃) |
| AO-2 | 2,2'-Methylenebis(4-methyl-6-tert-butylphenol) |
| AO-3 | Pentaerythritol tetrakis[3-(3,5-di-tert-butyl-4-hydroxyphenyl)propionate] |
| AO-4 | Triethylene glycol bis[3-(3-tert-butyl-5-methyl-4-hydroxyphenyl)propionate] |
| HALS-1 | Bis(2,2,6,6-tetramethyl-4-piperidyl) sebacate |
| HALS-2 | Poly[[6-[(1,1,3,3-tetramethylbutyl)amino]-s-triazine-2,4-diyl][(2,2,6,6-tetramethyl-4-piperidyl)imino]hexamethylene[(2,2,6,6-tetramethyl-4-piperidyl)imino]] |

TABLE 2

| Example | No. | Phenolic type Kind | Wt. % | Hindered amine type Kind | Wt. % | Thermal embrittlement induction period (hr) | Weather resistance (hr) |
|---|---|---|---|---|---|---|---|
| Present example | 1 | I-1 | 0.5 | — | — | 530 | 350 |
| | 2 | I-2 | 0.5 | — | — | 480 | 330 |
| | 3 | I-1 | 0.5 | HALS-1 | 0.5 | 580 | 850 |
| | 4 | " | 1.0 | " | 0.5 | 670 | 870 |
| | 5 | " | 0.5 | " | 1.0 | 590 | 910 |
| | 6 | " | 0.5 | HALS-2 | 0.5 | 560 | 830 |
| | 7 | " | 1.0 | " | 0.5 | 640 | 850 |
| | 8 | I-2 | 0.5 | HALS-1 | 0.5 | 560 | 830 |
| | 9 | " | 0.5 | HALS-2 | 0.5 | 550 | 820 |
| Comparative example | 10 | AO-1 | 0.5 | — | — | 290 | 200 |
| | 11 | AO-2 | 0.5 | — | — | 170 | 150 |
| | 12 | AO-3 | 0.5 | — | — | 380 | 200 |
| | 13 | AO-4 | 0.5 | — | — | 310 | 250 |
| | 14 | AO-1 | 0.5 | HALS-1 | 0.5 | 310 | 460 |
| | 15 | " | 0.5 | HALS-2 | 0.5 | 290 | 440 |
| | 16 | AO-2 | 0.5 | HALS-1 | 0.5 | 190 | 450 |
| | 17 | " | 0.5 | HALS-2 | 0.5 | 170 | 430 |
| | 18 | AO-3 | 0.5 | HALS-1 | 0.5 | 400 | 470 |
| | 19 | AO-3 | 1.0 | " | 0.5 | 430 | 480 |
| | 20 | " | 0.5 | " | 1.0 | 390 | 520 |
| | 21 | " | 0.5 | HALS-2 | 0.5 | 370 | 450 |
| | 22 | " | 1.0 | " | 0.5 | 400 | 460 |
| | 23 | AO-4 | 0.5 | HALS-1 | 0.5 | 380 | 500 |
| | 24 | " | 0.5 | HALS-2 | 0.5 | 340 | 490 |
| | 25 | — | — | — | — | 70 | 50 |

What is claimed is:

1. A stabilized polyacetal resin composition which comprises a polyacetal resin and a stabilizing amount of a phenolic type compound represented by the general formula (I),

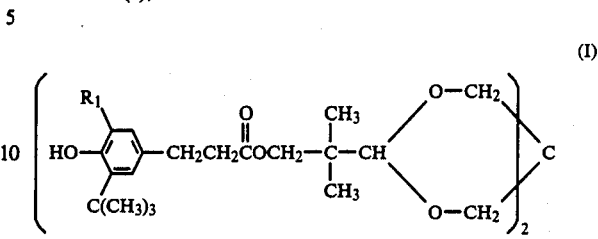

wherein $R_1$ represents a $C_1$–$C_3$ alkyl group.

2. A compound as claimed in claim 1 wherein the amount of the phenolic type compound is 0.01–10% by weight based on the polyacetal resin.

3. A stabilized polyacetal resin composition as claimed in claim 1 wherein the composition further contains a hindered piperidine compound in an amount of 0.5 to 5 times by weight based on the phenolic type compound (I).

4. A composition as claimed in claim 3 wherein the hindered piperidine compound is selected from bis(2,2,6,6-tetramethyl-4-piperidyl)sebacate and poly[[6-[(1,1,3,3-tetramethylbutyl)amino]-s-triazin-2,4-diyl][(2,2,6,6-tetramethyl-4-piperidyl)imino]hexamethylene[(2,2,6,6-tetramethyl-4-piperidyl)imino]].

* * * * *